United States Patent
Khoshnevisan et al.

(10) Patent No.: US 12,295,010 B2
(45) Date of Patent: May 6, 2025

(54) SOUNDING REFERENCE SIGNAL (SRS) RESOURCE SETS FOR MULTIPLE DOWNLINK CONTROL INFORMATION BASED SYSTEMS

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 18/351,358

(22) Filed: Jul. 12, 2023

(65) Prior Publication Data

US 2024/0023114 A1    Jan. 18, 2024

Related U.S. Application Data

(63) Continuation of application No. 17/457,212, filed on Dec. 1, 2021, now Pat. No. 11,737,112.

(51) Int. Cl.
*H04W 72/23*    (2023.01)
*H04L 5/00*    (2006.01)

(52) U.S. Cl.
CPC ........... *H04W 72/23* (2023.01); *H04L 5/0048* (2013.01)

(58) Field of Classification Search
CPC ........................ H04W 72/23; H04L 5/0048
See application file for complete search history.

(56) References Cited

U.S. PATENT DOCUMENTS

| | | |
|---|---|---|
| 2021/0289525 A1* | 9/2021 | Khoshnevisan ...... H04L 5/0053 |
| 2021/0360594 A1 | 11/2021 | Park et al. |
| 2023/0171783 A1 | 6/2023 | Khoshnevisan et al. |

FOREIGN PATENT DOCUMENTS

WO    WO-2021227958 A1    11/2021

OTHER PUBLICATIONS

Jul. 9, 2024.*
International Search Report and Written Opinion—PCT/US2022/079233—ISA/EPO—Feb. 13, 2023.
(Continued)

*Primary Examiner* — Ronald B Abelson
(74) *Attorney, Agent, or Firm* — Patterson + Sheridan, L.L.P.

(57) ABSTRACT

Certain aspects of the present disclosure provide techniques for wireless communications by a user equipment (UE). The UE may receive signaling configuring the UE with first and second sounding reference signal (SRS) resource sets. The UE may receive a first downlink control information (DCI) that schedules a first physical uplink shared channel (PUSCH) and indicates a first sounding reference signal (SRS) resource indicator (SRI) value, and a second DCI that schedules a second PUSCH and indicates a second SRI value. The UE may determine SRS resources indicated by the first and second SRI values based on an association between control resource set (CORESET) pool index values and the first and second SRS resource sets. The UE may transmit the first PUSCH indicated by the first SRI value and the second PUSCH indicated by the second SRI value, in accordance with the determination.

28 Claims, 15 Drawing Sheets

(56) References Cited

OTHER PUBLICATIONS

ZTE: "Multi-TRP Enhancements for PDCCH, PUCCH and PUSCH", 3GPP TSG RAN WG1 Meeting #106b-e, R1-2108871, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 1, 2021, 13 Pages, XP052057747.

* cited by examiner

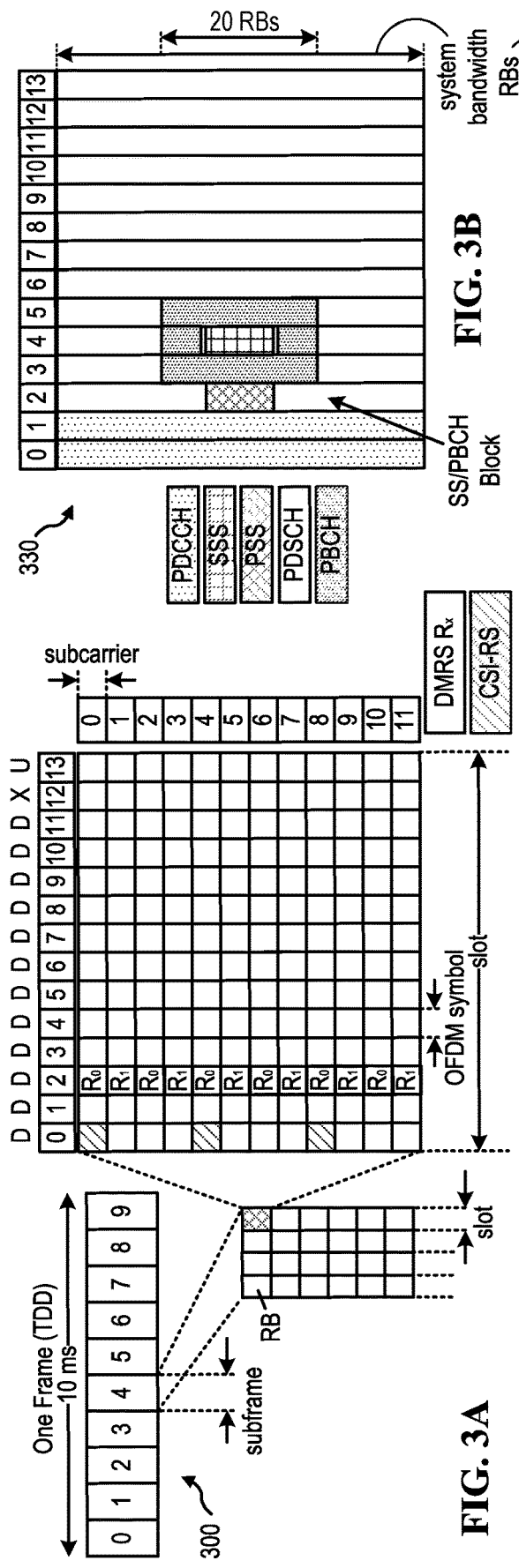
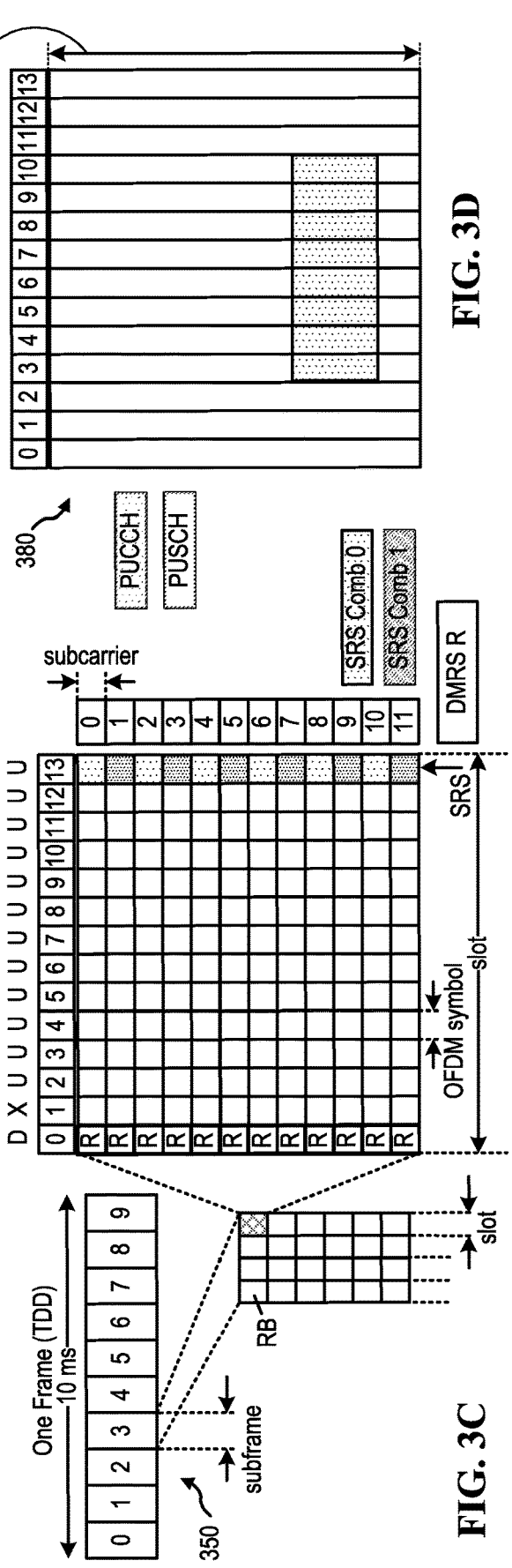
FIG. 3A  FIG. 3B  FIG. 3C  FIG. 3D

SRI Indication for Codebook Based PUSCH Transmission, if
ul-FullPowerTransmission = FullpowerMode2 and $N_{SRS} = 4$

| Bit field mapped to index | SRI(s), $N_{SRS} = 4$ |
|---|---|
| 0 | 0 |
| 1 | 1 |
| 2 | 2 |
| 3 | 3 |

FIG. 5

SRI Indication for Non-Codebook Based PUSCH Transmission, $L_{max}=4$

| Bit field mapped to index | SRI(s), $N_{SRS}=2$ | Bit field mapped to index | SRI(s), $N_{SRS}=3$ | Bit field mapped to index | SRI(s), $N_{SRS}=4$ |
|---|---|---|---|---|---|
| 0 | 0 | 0 | 0 | 0 | 0 |
| 1 | 1 | 1 | 1 | 1 | 1 |
| 2 | 0,1 | 2 | 2 | 2 | 2 |
| 3 | reserved | 3 | 0,1 | 3 | 3 |
|   |   | 4 | 0,2 | 4 | 0,1 |
|   |   | 5 | 1,2 | 5 | 0,2 |
|   |   | 6 | 0,1,2 | 6 | 0,3 |
|   |   | 7 | reserved | 7 | 1,2 |
|   |   |   |   | 8 | 1,3 |
|   |   |   |   | 9 | 2,3 |
|   |   |   |   | 10 | 0,1,2 |
|   |   |   |   | 11 | 0,1,3 |
|   |   |   |   | 12 | 0,2,3 |
|   |   |   |   | 13 | 1,2,3 |
|   |   |   |   | 14 | 0,1,2,3 |
|   |   |   |   | 15 | reserved |

FIG. 7

SOUNDING REFERENCE SIGNAL (SRS) RESOURCE SETS FOR MULTIPLE DOWNLINK CONTROL INFORMATION BASED SYSTEMS

CROSS-REFERENCE TO RELATED APPLICATIONS

This application is a continuation of U.S. Non-Provisional application Ser. No. 17/457,212, entitled "SOUNDING REFERENCE SIGNAL (SRS) RESOURCE SETS FOR MULTIPLE DOWNLINK CONTROL INFORMATION BASED SYSTEMS", filed Dec. 1, 2021 which is hereby incorporated by reference in its entirety as if fully set forth below and for all applicable purposes.

INTRODUCTION

Aspects of the present disclosure relate to wireless communications, and more particularly, to techniques for managing sounding reference signal (SRS) resource sets for multiple downlink control information (multi-DCI) based systems.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a user equipment (UE), comprising: receiving, from a network entity, signaling configuring the UE with at least first and second sounding reference signal (SRS) resource sets; receiving a first downlink control information (DCI) that schedules a first physical uplink shared channel (PUSCH) and indicates a first sounding reference signal (SRS) resource indicator (SRI) value; receiving a second DCI that schedules a second PUSCH and indicates a second SRI value; determining SRS resources indicated by the first and second SRI values based on an association between control resource set (CORESET) pool index values and the first and second SRS resource sets; transmitting the first PUSCH with a first set of transmission parameters indicated by the first SRI value, in accordance with the determination; and transmitting the second PUSCH with a second set of transmission parameters indicated by the second SRI value, in accordance with the determination.

Another aspect provides a method for wireless communication by a network entity, comprising: transmitting, to a UE, signaling configuring the UE with at least first and second SRS resource sets; transmitting, to the UE, a first DCI that schedules a first PUSCH and indicates a first SRI value; transmitting, to the UE, a second DCI that schedules a second PUSCH and indicates a second SRI value; receiving the first PUSCH with a first set of transmission parameters used for transmitting SRS resources indicated by the first SRI value, the SRS resources indicated by the first and second SRI values are based on an association between CORESET pool index values and the first and second SRS resource sets; and receiving the second PUSCH with a second set of transmission parameters used for transmitting the SRS resources indicated by the second SRI value.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIG. 5 depicts example table illustrating sounding reference signal (SRS) resource indicator (SRI) indication for CB-based physical uplink shared channel (PUSCH) transmission.

FIG. 7 depicts example table illustrating SRI indication for NCB-based PUSCH transmission.

DETAILED DESCRIPTION

Aspects of the present disclosure provide apparatuses, methods, processing systems, and computer-readable mediums for configuring multi-downlink control information (DCI) based physical uplink shared channel (PUSCH) transmissions.

In conventional systems, there may be limitations on PUSCH transmissions. For example, such limitations may prohibit having two PUSCHs in a same component carrier (CC) that are overlapping in time.

Techniques described herein, however, may enable simultaneous PUSCH transmission in a CC. In some cases, two sounding reference signal (SRS) resource sets may be configured for multi-DCI based codebook (CB) or non-CB (NCB) PUSCH transmissions.

The techniques described herein may indicate an association between the two SRS resource sets and two control resource set (CORESET) pool index values. This association may provide an efficient mechanism for a UE to determine whether an SRS resource indicator (SRI) in a DCI indicates SRS resources from a first SRS resource set or a second SRS resource set.

Introduction to Wireless Communication Networks

Figure 1:
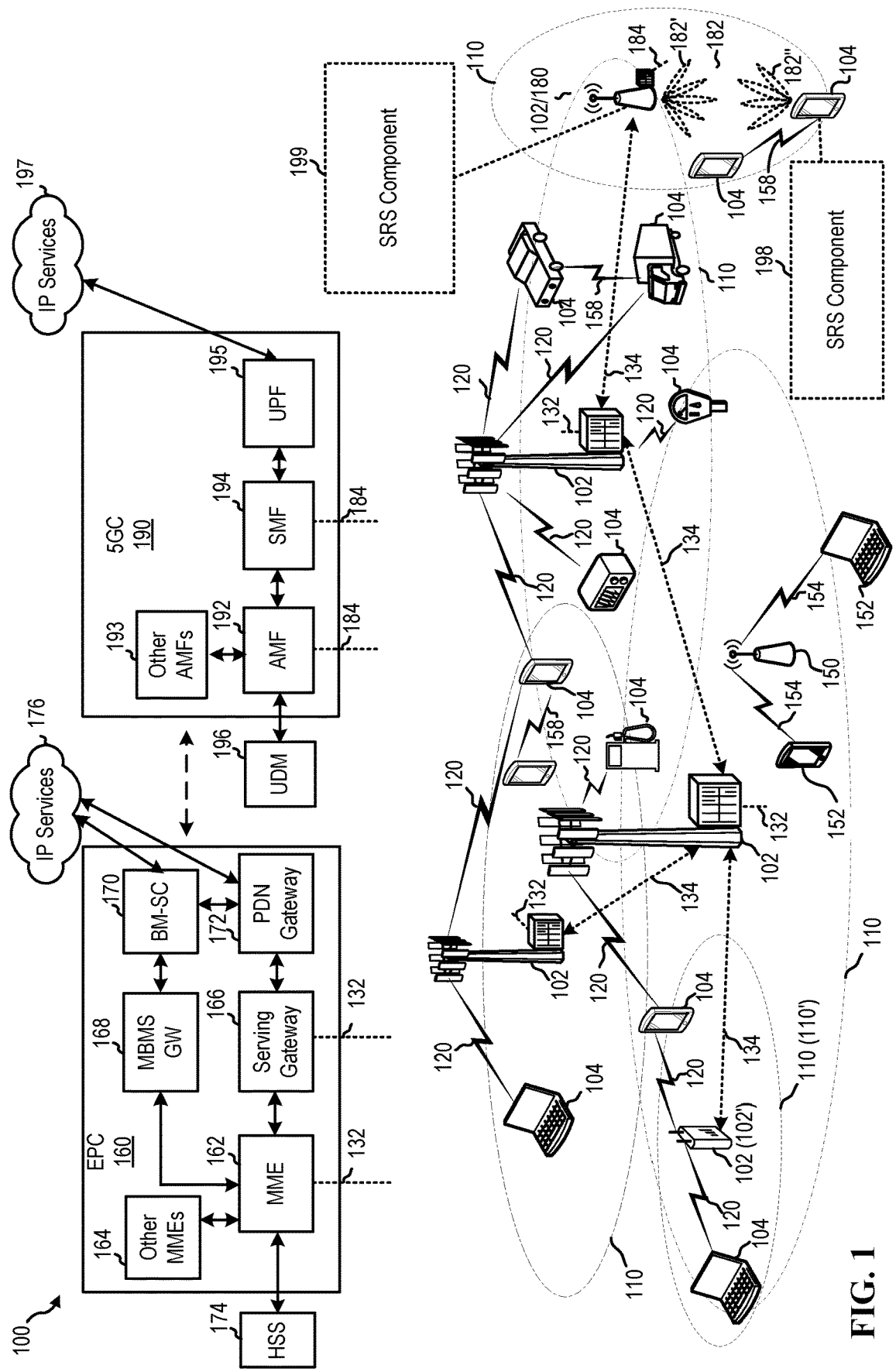
FIG. 1 is a block diagram conceptually illustrating an example wireless communication network.

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs may include and/or be referred to as a gNB, NodeB, eNB, ng-eNB (e.g., an eNB that has been enhanced to provide connection to both EPC 160 and 5GC 190), an access point, a base transceiver station, a radio BS, a radio transceiver, or a transceiver function, or a transmission reception point in various contexts.

A BS, such as BS 102, may include components that are located at a single physical location or components located at various physical locations. In examples in which the BS includes components that are located at various physical locations, the various components may each perform various functions such that, collectively, the various components achieve functionality that is similar to a BS that is located at a single physical location. As such, a BS may equivalently refer to a standalone BS or a BS including components that are located at various physical locations or virtualized locations. In some implementations, a BS including components that are located at various physical locations may be referred to as or may be associated with a disaggregated radio access network (RAN) architecture, such as an Open RAN (O-RAN) or Virtualized RAN (VRAN) architecture. In some implementations, such components of a BS may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Figure 11:
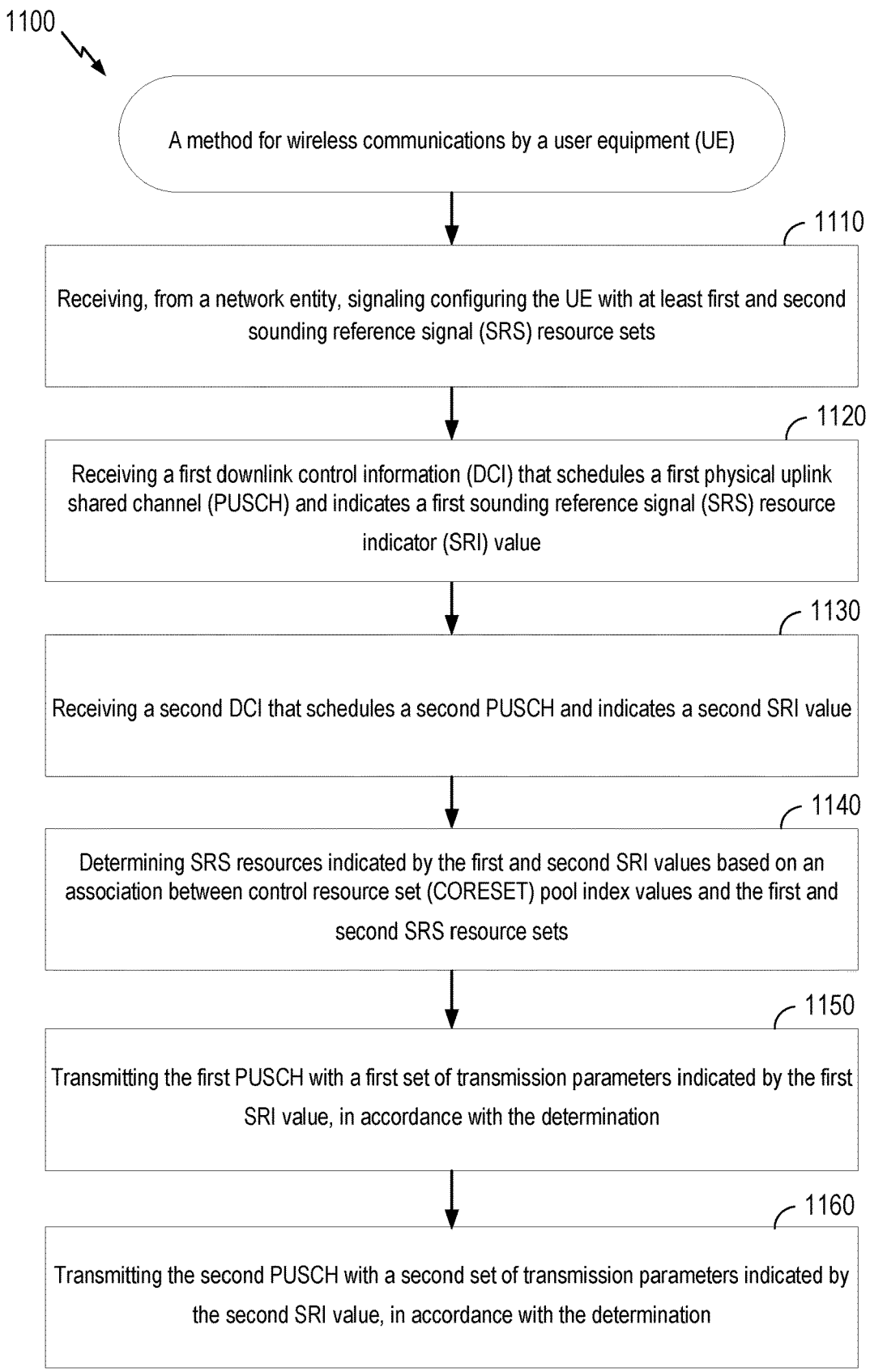
FIG. 11 is a flow diagram illustrating example operations for wireless communication by a UE.
Figure 12:
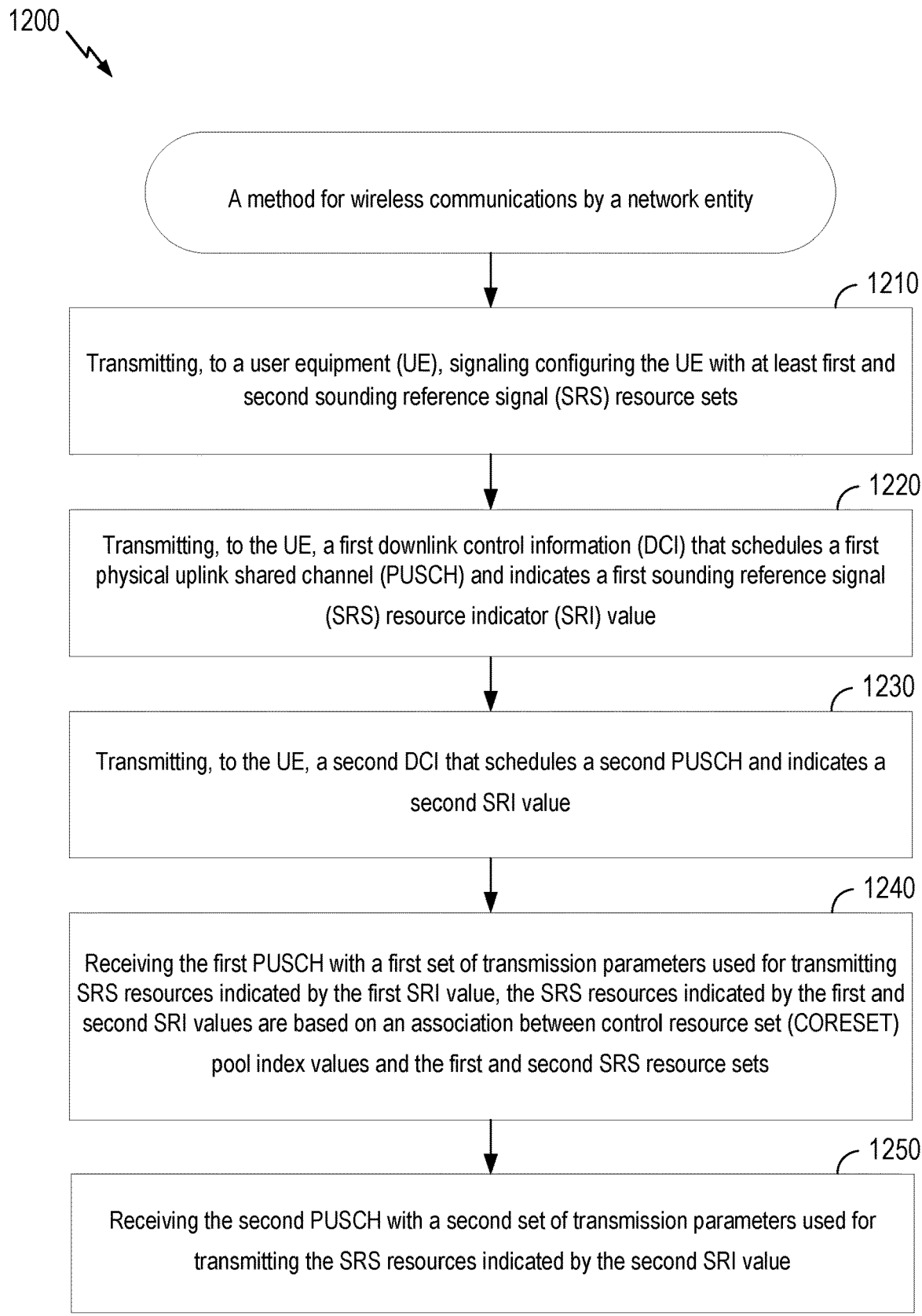
FIG. 12 is a flow diagram illustrating example operations for wireless communication by a network entity.

Wireless communication network 100 includes sounding reference signal (SRS) component 199, which may be configured to perform operations 1200 of FIG. 12. Wireless communication network 100 further includes SRS component 198, which may be used configured to perform operations 1100 of FIG. 11.

Figure 2:
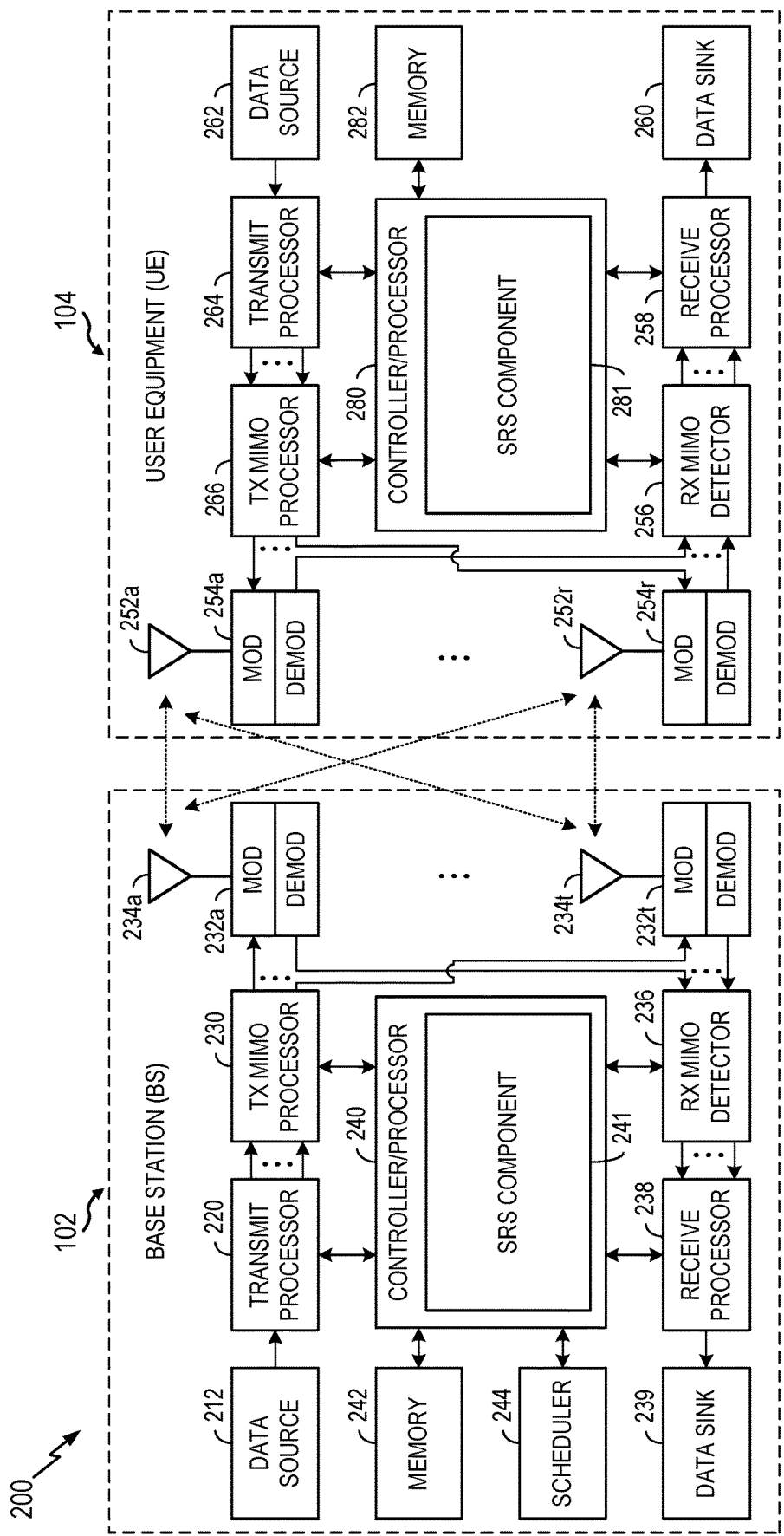
FIG. 2 is a block diagram conceptually illustrating aspects of an example base station (BS) and user equipment (UE).

FIG. 2 depicts aspects of an example BS 102 and a UE 104. Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes SRS component 241, which may be representative of SRS component 199 of FIG. 1. Notably, while depicted as an aspect of controller/processor 240, SRS component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes SRS component 281, which may be representative of SRS component 198 of FIG. 1. Notably, while depicted as an aspect of controller/processor 280, SRS component 281 may be implemented additionally or alternatively in various other aspects of UE 104 in other implementations.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

$5^{th}$ generation (5G) networks may utilize several frequency ranges, which in some cases are defined by a standard, such as 3rd generation partnership project (3GPP) standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (BS) (e.g., BS 180) configured to communicate using mmWave/near mmWave radio frequency bands may utilize beamforming (e.g., 182) with a user equipment (UE) (e.g., UE 104) to improve path loss and range.

Example Codebook (CB) and Non-CB (NCB) Based PUSCH Transmissions

Some deployments (e.g., New Radio (NR) Release 15 and 16 systems) support codebook (CB)-based and non-CB (NCB)-based transmission schemes for uplink (UL) transmissions with wideband precoders.

For a CB-based UL transmission, a user equipment (UE) is configured with only one sounding reference signal (SRS) resource set (e.g., with usage set to CB). For example, a maximum of four SRS resources within the SRS resource set are configured for the UE. Each SRS resource may be radio resource control (RRC) configured with a number of SRS ports. An SRS resource indicator (SRI) field (e.g., SRS resource indicator) in an UL downlink control information (DCI) (e.g., scheduling a physical uplink shared channel (PUSCH)) may indicate one SRS resource. The number of SRS ports configured for the indicated SRS resource determines a number of antenna ports for the PUSCH. The UE transmits the PUSCH with a same spatial domain filter (i.e., UL beam) as the indicated SRS resource. A number of layers (e.g., rank) and transmit precoding matrix index (TPMI) (e.g., precoder) for the scheduled PUSCH may be determined from a separate DCI field (e.g., precoding information and number of layers).

Figure 4:
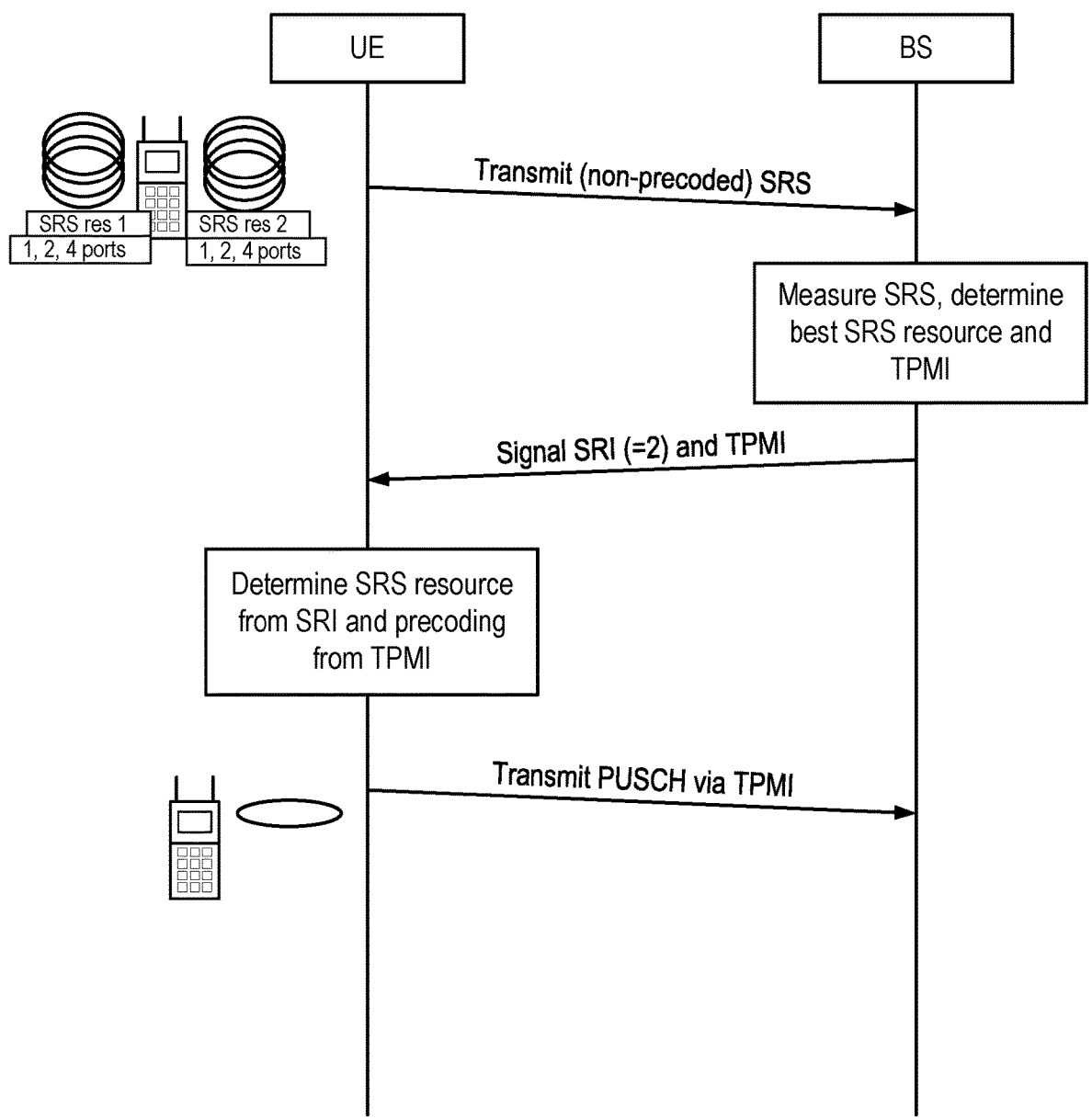
FIG. 4 is a call flow diagram illustrating an example of codebook (CB) based uplink (UL) transmission.

FIG. 4 is a call flow diagram illustrating an example of CB-based UL transmission using a wideband precoder. As illustrated, a UE transmits (non-precoded) SRS with up to two SRS resources (with each SRS resource having one, two, or four SRS ports). A base station (BS) measures the SRS and, based on the measurement, selects one SRS resource and a wideband precoder to be applied to the SRS ports within the selected SRS resource. As further illustrated, the BS configures the UE with the selected SRS resource via an SRI and with the wideband precoder via a TPMI. For a dynamic grant, the SRI and TPMI may be configured via DCI format 0_1. For a configured grant (e.g., for semi-persistent UL), the SRI and TPMI may be configured via RRC or DCI. The UE determines the selected SRS resource from the SRI and precoding from TPMI and transmits PUSCH accordingly. Example SRI for CB-based PUSCH transmission is illustrated in FIG. 5.

For a NCB-based UL transmission, a UE is configured with only one SRS resource set (e.g., with usage set to NCB). For example, a maximum of four SRS resources within the SRS resource may be configured for the UE. Each SRS resource has one SRS port. An SRI field in an UL DCI (e.g., scheduling a PUSCH) indicates one or multiple SRS resources. A number of indicated SRS resources determines a rank (e.g., a number of layers) for the scheduled PUSCH. The UE transmits the PUSCH with a same precoder as well as spatial domain filter (e.g., beam) as the indicated SRS resources.

Figure 6:
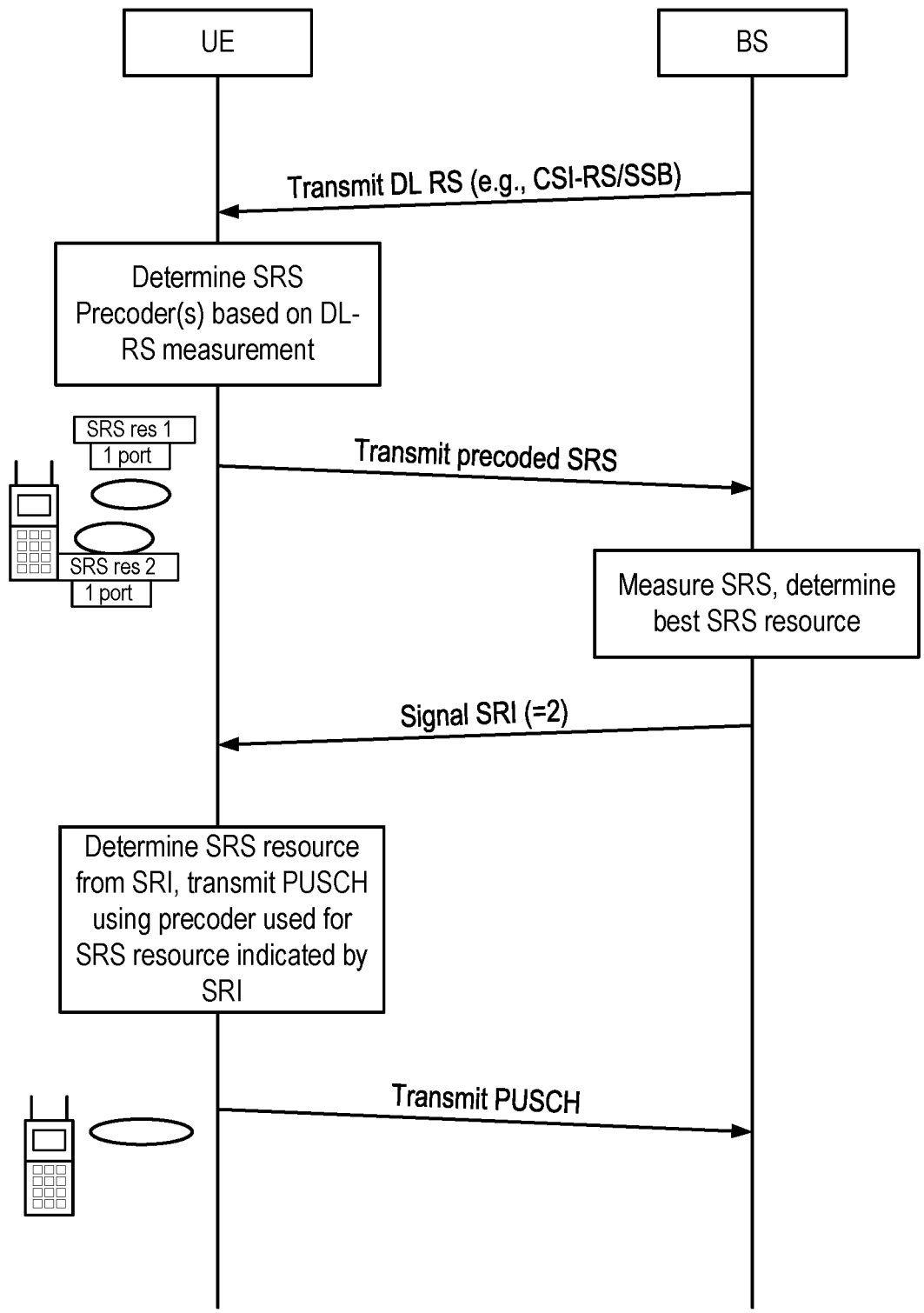
FIG. 6 is a call flow diagram illustrating an example of non-CB (NCB)-based UL transmission.

FIG. 6 is a call flow diagram illustrating an example of NCB-based UL transmission. As illustrated, a UE transmits (precoded) SRS to a BS. While the example shows two SRS resources, the UE may transmit with up to four SRS resources (with each resource having one port). The BS measures the SRS and, based on the measurement, selects one or more SRS resource. In this case, since the UE sent the SRS precoded, by selecting the SRS resource, the BS is effectively also selecting precoding. For NCB-based UL transmission, each SRS resource corresponds to a layer. The precoder of the layer is actually the precoder of the SRS, which is emulated by the UE. Selecting N SRS resources means the rank is N. The UE then transmits a PUSCH using the same precoder as the SRS. As further illustrated, the BS configures the UE with the selected SRS resource via an SRI. For a dynamic grant, the SRI may be configured via DCI format 0_1. For a configured grant, the SRI may be configured via RRC or DCI. Example SRI for NCB-based PUSCH transmission is illustrated in FIG. 7.

In above-noted CB and NCB based UL transmission cases, a size of an SRI field (e.g., in UL DCI for DCI format 0_1) is a function of number of SRS resources within a SRS resource set.

In Release 16, another DCI format (e.g., DCI format 0_2) for scheduling a PUSCH is introduced. This format reduces a size of a DCI (e.g., by decreasing a number of bits needed for each DCI field based on RRC configuration). SRS resource sets (e.g., for both CB and NCB) may be separately configured for the PUSCH (e.g., scheduled by the DCI format 0_2). For example, RRC parameter (e.g., srs-ResourceSetToAddModListDCI-0-2) may be used (e.g., while srs-ResourceSetToAddModList is used for the DCI format 0_1). For CB, only one SRS resource set (e.g., with usage set to CB) can be configured (e.g., within the srs-ResourceSetToAddModListDCI-0-2). For NCB, only one SRS resource set (e.g., with usage set to NCB) can be configured (e.g., within the srs-ResourceSetToAddModListDCI-0-2). In such cases, a smaller number of SRS resources ($N_{SRS,\ 0\_2}$) within a SRS resource set may be configured, which may result in a smaller SRI bit width. However, $N_{SRS,\ 0\_2}$ SRS resources within the SRS resource set (e.g., for the DCI format 0_2) may need to be first $N_{SRS,\ 0\_2}$ SRS resources within the SRS resource set (e.g., for the DCI format 0_1). This is to ensure that UE complexity is not increased (e.g., for the DCI format 0_2) using a subset of SRS resources in the SRS resource set (e.g., configured for the DCI format 0_1).

Example Time Division Multiplexing (TDM)-Based PUSCH

NR Release 17 may specify a single downlink control information (DCI) based physical uplink shared channel (PUSCH) repetition in a time division multiplex (TDM) manner corresponding to different transmission parameters (e.g., a beam/spatial relation, a power control, and/or a precoding).

Figure 8:
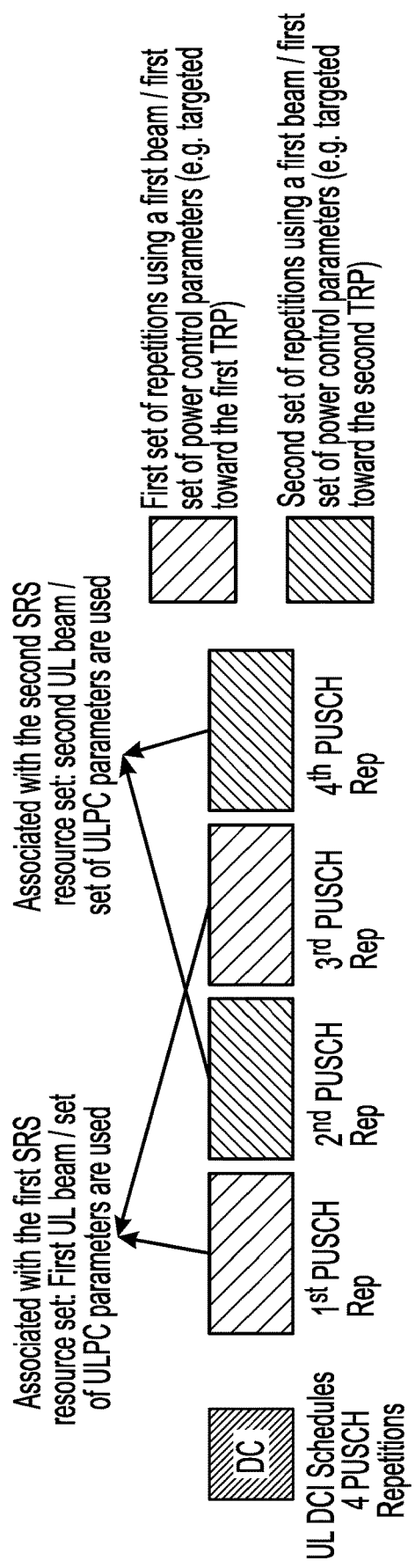
FIG. 8 illustrates example single downlink control information (DCI) based PUSCH repetition in a time division multiplex (TDM) manner.

As illustrated in FIG. 8, such PUSCH repetitions (e.g., four PUSCH repetitions scheduled by a single DCI) may belong to two sounding reference signal (SRS) resource sets, and each SRS resource set may have its own beam and power control (PC) parameters. For example, a first PUSCH repetition and a third PUSCH repetition is associated with a first SRS resource set (e.g., a first uplink (UL) beam/set of UL PC parameters are used). A second PUSCH repetition and a fourth PUSCH repetition is associated with a second SRS resource set (e.g., a second UL beam/set of UL PC parameters are used).

To implement this case, two sets of PUSCH repetitions may correspond to two SRS resource sets. In addition, the DCI indicates two beams/two sets of PC parameters using two corresponding SRS resource indicator (SRI) fields for both codebook (CB)-based and non CB (NCB)-based systems.

Example Multi-DCI Based Multi-TRP System

Figure 9:
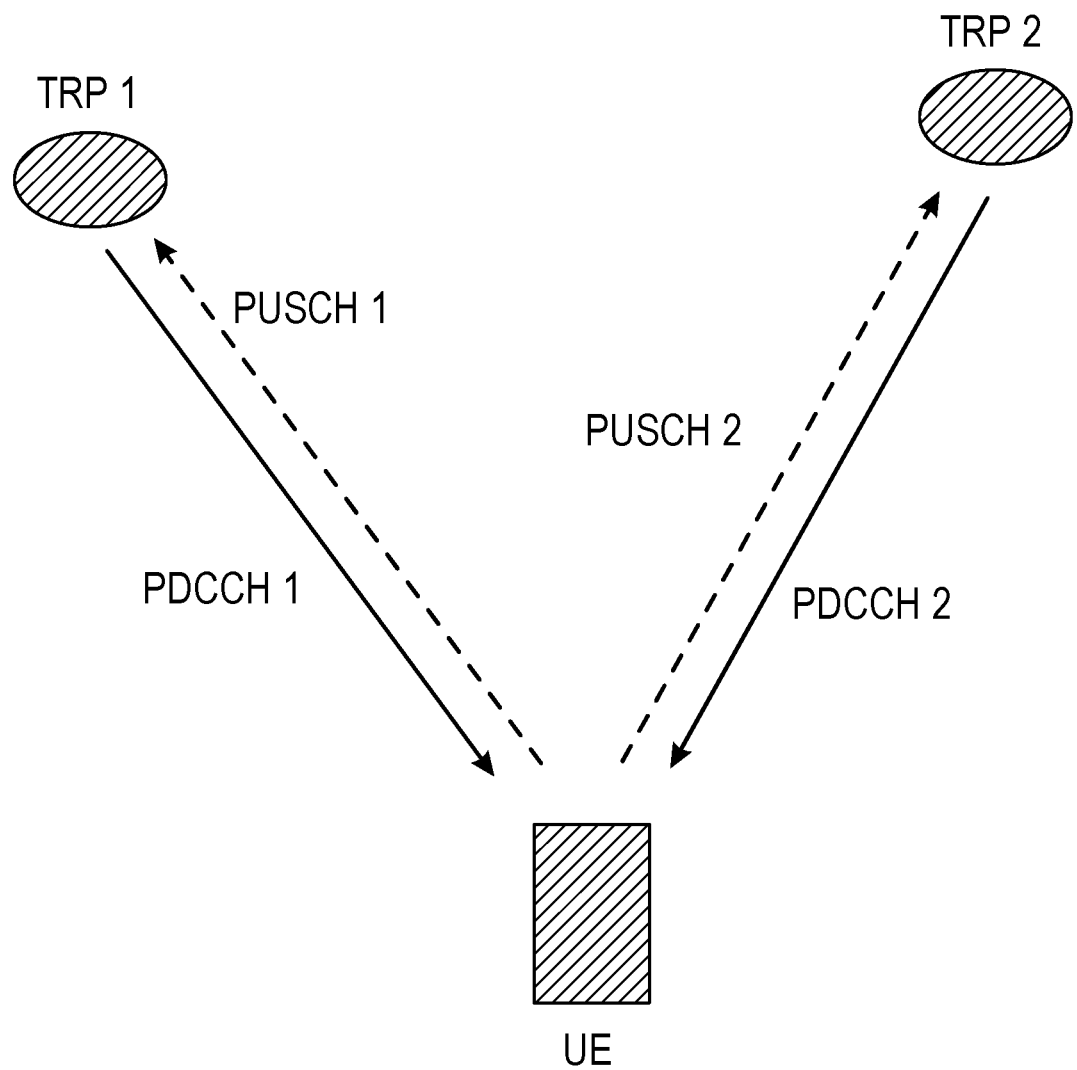
FIG. 9 illustrates example an example of multi-DCI based transmissions to multiple transmission and reception points (mTRP).

As illustrated in FIG. 9, in some NR systems, a first downlink control information (DCI) (e.g., transmitted from a first transmission and reception point (TRP1) to a user equipment (UE)) schedules a first PUSCH (e.g., PUSCH1 transmitted to the TRP1 from the UE), and a second DCI (e.g., transmitted from a second TRP (e.g., TRP2) to the UE) schedules a second PUSCH (e.g., PUSCH2 transmitted to the TRP2 from the UE).

Figure 10:
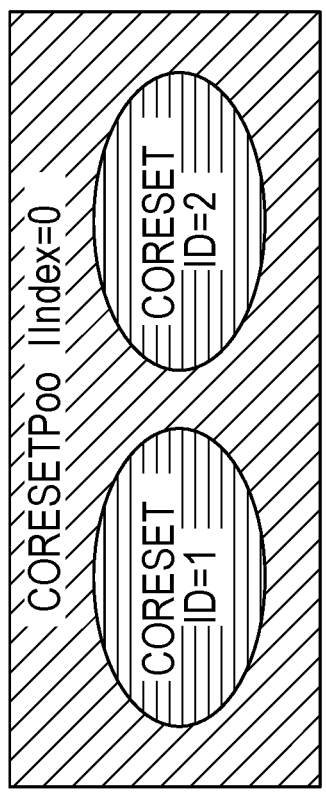
FIG. 10 illustrates example control resource set (CORESET) pool index values.
Figure 10:
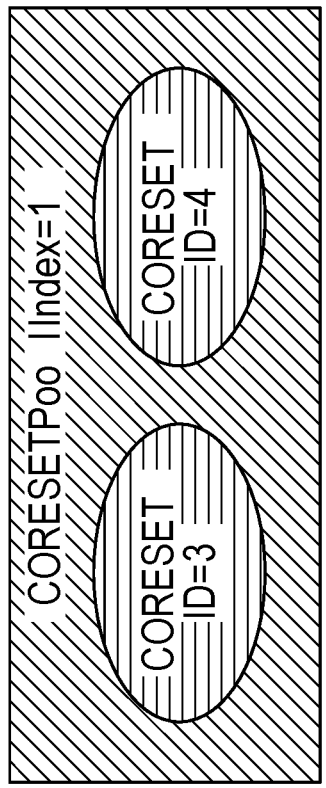

In such cases, TRP differentiation at the UE is based on a control resource set (CORESET) pool index. Each CORESET (e.g., a maximum number of five CORESETs) may be configured with a value of the CORESET pool index. As illustrated in FIG. 10, the value of the CORESET pool index may be zero or one. Based on the CORESET pool index value, CORESETs may be grouped into two groups.

In some cases, the UE may be considered to be configured with multi-DCI based multi-TRP, when the UE is configured by a higher layer parameter (e.g., a physical downlink control channel (PDCCH)-Config) that contains two different values of CORESET pool index in CORESETs for an active bandwidth part (BWP) of a serving cell.

In some cases, the PUSCHs may be time division multiplexed (TDMed) in a given component carrier (CC)/serving cell (e.g., even across different TRPs/CORESET pool index values).

In Release 15, 16, 17 systems, it is not possible to have two PUSCHs in a same CC that are overlapping in time. However, in Release 18 system, simultaneous PUSCH transmission (e.g., two PUSCHs that are at least partially overlapping in a time domain) in one CC is possible.

One technique to support the simultaneous PUSCH transmission in one CC is by using a multi-DCI based multi-TRP system (e.g., based on CORESET pool index). In the multi-DCI based multi-TRP system, two sounding reference signal (SRS) resource sets may be configured (e.g., where each SRS resource set is associated with one CORESET pool index value). In this case, to determine whether an SRS resource indicator (SRI) indicates SRS resource or SRS resources (e.g., for non-code book (NCB)) from a first SRS resource set or from a second SRS resource set, an SRI field in an uplink (UL) DCI may be interpreted differently depending on whether the DCI is detected in a CORESET (e.g., with CORESET pool index value of 0 or 1).

Aspects Related to SRS Resource Sets for Multi-DCI Based CB or NCB PUSCH

Aspects of the present disclosure provide apparatuses, methods, processing systems, and computer-readable mediums for configuring sounding reference signal (SRS) resource sets for multi downlink control information (DCI) based codebook (CB) or non-CB (NCB) physical uplink shared channel (PUSCH).

The techniques described herein utilize an association between two SRS resource sets and two control resource set (CORESET) pool index values (e.g. to determine whether an SRS resource indicator (SRI) in a DCI indicates SRS resources from a first SRS resource set or a second SRS resource set). The techniques described herein further indicate constraints on a number of SRS resources within each of the two SRS resource sets, and how to determine a size of an SRI field.

FIG. 11 illustrates example operations 1100 for wireless communication. The operations 1100 may be performed, for example, by a UE (e.g., such as UE 104 in wireless communication network 100 of FIG. 1). The operations 1100 may be implemented as software components that are executed and run on one or more processors (e.g., controller/processor 280 of FIG. 2). Further, transmission and reception of signals by the UE in the operations 1100 may be enabled, for example, by one or more antennas (e.g., antennas 252 of FIG. 2). In certain aspects, the transmission and/or reception of signals by the UE may be implemented via a bus interface of one or more processors (e.g., the controller/processor 280) obtaining and/or outputting signals.

The operations 1100 begin, at 1110, by receiving from a network entity signaling configuring the UE with at least first and second SRS resource sets. For example, the UE may receive the signaling from the network entity using antenna(s) and/or receiver/transceiver components of UE 104 shown in FIG. 1 or FIG. 2 and/or of the apparatus shown in FIG. 14.

At 1120, the UE receives a first DCI that schedules a first PUSCH and indicates a first SRI value. For example, the UE may receive the first DCI from the network entity using antenna(s) and/or receiver/transceiver components of UE 104 shown in FIG. 1 or FIG. 2 and/or of the apparatus shown in FIG. 14.

At 1130, the UE receives a second DCI that schedules a second PUSCH and indicates a second SRI value. For example, the UE may receive the second DCI from the network entity using antenna(s) and/or receiver/transceiver components of UE 104 shown in FIG. 1 or FIG. 2 and/or of the apparatus shown in FIG. 14.

At 1140, the UE determines SRS resources indicated by the first and second SRI values based on an association between CORESET pool index values and the first and second SRS resource sets. For example, the UE may determine the SRS resources using a processor, antenna(s), and/or transceiver components of UE 104 shown in FIG. 1 or FIG. 2 and/or of the apparatus shown in FIG. 14.

At 1150, the UE transmits the first PUSCH with a first set of transmission parameters (used for transmitting the SRS resources) indicated by the first SRI value, in accordance with the determination. For example, the UE may transmit the first PUSCH to the network entity using antenna(s) and/or transmitter/transceiver components of UE 104 shown in FIG. 1 or FIG. 2 and/or of the apparatus shown in FIG. 14.

At 1160, the UE transmits the second PUSCH with a second set of transmission parameters (used for transmitting the SRS resources) indicated by the second SRI value, in accordance with the determination. For example, the UE may transmit the second PUSCH to the network entity using antenna(s) and/or transmitter/transceiver components of UE 104 shown in FIG. 1 or FIG. 2 and/or of the apparatus shown in FIG. 14.

FIG. 12 illustrates example operations 1200 for wireless communication. The operations 1200 may be performed, for example, by a network entity (e.g., such as BS 102 in wireless communication network 100 of FIG. 1). The operations 1200 may be implemented as software components that are executed and run on one or more processors (e.g., controller/processor 240 of FIG. 2). Further, transmission and reception of signals by the network entity in the operations 1200 may be enabled, for example, by one or more antennas (e.g., antennas 234 of FIG. 2). In certain aspects, the transmission and/or reception of signals by the network entity may be implemented via a bus interface of one or more processors (e.g., the controller/processor 240) obtaining and/or outputting signals.

The operations 1200 begin, at 1210, by transmitting to a UE signaling configuring the UE with at least first and second SRS resource sets. For example, the network entity may transmit the signaling to the UE using antenna(s) and transmitter/transceiver components of BS 102 shown in FIG. 1 or FIG. 2 and/or of the apparatus shown in FIG. 15.

At 1220, the network entity transmits to the UE a first DCI that schedules a first PUSCH and indicates a first SRI value. For example, the network entity may transmit the first DCI to the UE using antenna(s) and transmitter/transceiver components of BS 102 shown in FIG. 1 or FIG. 2 and/or of the apparatus shown in FIG. 15.

At 1230, the network entity transmits to the UE a second DCI that schedules a second PUSCH and indicates a second SRI value. For example, the network entity may transmit the second DCI to the UE using antenna(s) and transmitter/transceiver components of BS 102 shown in FIG. 1 or FIG. 2 and/or of the apparatus shown in FIG. 15.

At 1240, the network entity receives the first PUSCH with a first set of transmission parameters used for transmitting SRS resources indicated by the first SRI value. The SRS resources indicated by the first and second SRI values are based on an association between control resource set (CORESET) pool index values and the first and second SRS resource sets. For example, the network entity may receive the first PUSCH from the UE using antenna(s) and receiver/transceiver components of BS 102 shown in FIG. 1 or FIG. 2 and/or of the apparatus shown in FIG. 15.

At 1250, the network entity receives the second PUSCH with a second set of transmission parameters used for transmitting the SRS resources indicated by the second SRI value. For example, the network entity may receive the second PUSCH from the UE using antenna(s) and receiver/transceiver components of BS 102 shown in FIG. 1 or FIG. 2 and/or of the apparatus shown in FIG. 15.

Figure 13:
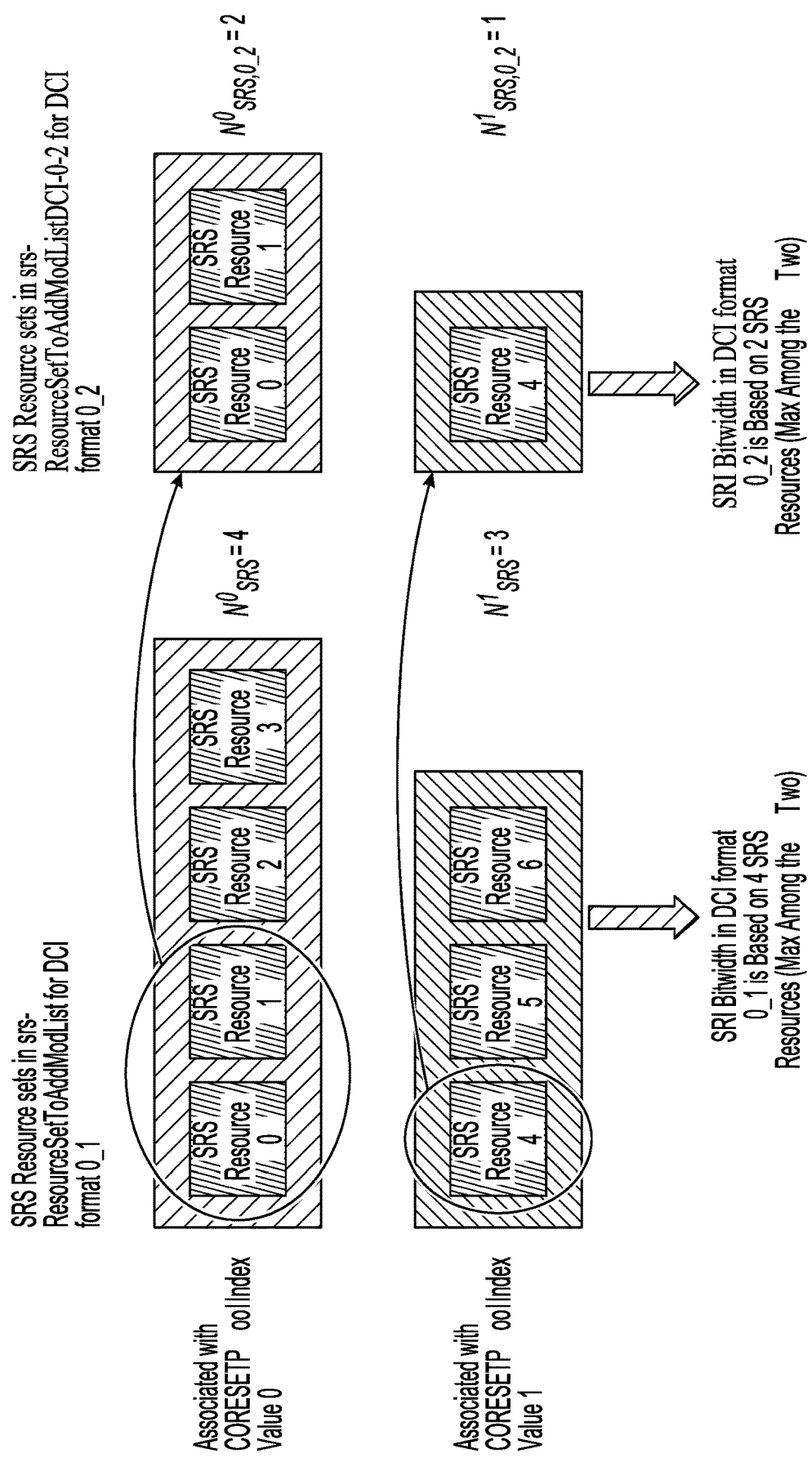
FIG. 13 depicts example SRS resources within SRS resource sets.

The operations shown in FIGS. 11 and 12 may be understood with reference to the FIG. 13.

As noted above, the UE may determine the SRS resources indicated by SRI values based on an association. For example, the UE may determine the SRS resources indicated by the first SRI value, based on the association between a CORESET pool index value (e.g., for a CORESET in which the first DCI was detected) and the first and second SRS resource sets. In another example, the UE may determine the SRS resources indicated by the second SRI value based on the association between a CORESET pool index value (e.g., for a CORESET in which the second DCI was detected) and the first and second SRS resource sets.

In certain aspects, the first DCI and the second DCI have a first format or a second format. One or more fields in the second format may have fewer bits than a corresponding one or more fields in the first format. In one example, the first format may correspond to DCI format 0_1. In another example, the second format may correspond to DCI format 0_2.

In certain aspects, according to the association, whichever of the first or second SRS resource set has a lower identifier (ID) is associated with a first CORESET pool index value, and whichever of the first or second SRS resource set has a higher ID is associated with a second CORESET pool index value.

For example, an SRS resource set with a lower ID is associated with a first CORESET pool index value (e.g., CORESET pool index value 0) and an SRS resource set with a higher ID is associated with a second CORESET pool index value (e.g., CORESET pool index value 1). In another example, when the UE is also configured to receive the first DCI and the second DCI in the second format, another two SRS resource sets associated with two CORESET pool index values can be configured in a list of SRS resource sets (e.g., srs-ResourceSetToAddModListDCI-0-2).

In certain aspects, the UE receives signaling indicating a first CORESET pool index value and a second CORESET pool index value. The first CORESET pool index value is associated with the first SRS resource set. The second CORESET pool index value is associated with the second SRS resource set. For example, the associated CORESET pool index value is configured for each of two SRS resource sets (or for each of additional two SRS resource sets for the second format of DCIs). The configuration is in a radio resource control (RRC) (and as part of each SRS resource set configuration).

In certain aspects, at most one SRS resource set for a CB or a NCB based transmission is configured with a CORESET pool index value. For example, the UE does not expect more than one SRS resource set for the first format of DCIs and more than one SRS resource set for the second format of DCIs with usage set to CB/NCB to be configured with a given CORESET pool index value.

In certain aspects, the UE receives signaling indicating a first CORESET pool index value and a second CORESET pool index value. The first CORESET pool index value is associated with the first SRS resource set (e.g., including a first number of SRS resources). The UE receives the first DCI in a CORESET with the first CORESET pool index value. The second CORESET pool index value is associated with the second SRS resource set (e.g., including a second number of SRS resources). The UE receives the second DCI in a CORESET with the second CORESET pool index value. For example, as illustrated in FIG. 13, the first SRS resource set associated with the CORESET pool index value 0 may have $N_{SRS}^0$ SRS resources (e.g., 4 SRS resources), and the second SRS resource set associated with the CORESET pool index value 1 may have $N_{SRS}^1$ SRS resources (e.g., 3 SRS resources).

In certain aspects, the first number of SRS resources is equal to the second number of SRS resources. In such cases, a size of a first SRI field in the first DCI is based on the first number of SRS resources and a second SRI field in the second DCI is based on the second number of SRS resources. For example, when two SRS resource sets associated with two CORESET pool index values may have a same number of SRS resources (e.g., $N_{SRS}^0 = N_{SRS}^1$), the number of bits for the SRI field in each DCI is determined based on this number.

In certain aspects, the first number of SRS resources may be different from the second number of SRS resources (e.g., $N_{SRS}^0 > N_{SRS}^1$ or $N_{SRS}^0 < N_{SRS}^1$).

In certain aspects, a size of a first SRI field in the first DCI and a second SRI field in the second DCI is based on the first number of SRS resources (e.g., when the first number of SRS resources are more than the second number of SRS resources, as illustrated in FIG. 13) or the second number of SRS resources (e.g., when the second number of SRS resources are more than the first number of SRS resources). For example, a number of bits for an SRI field in the DCI is determined based on a maximum of ($N_{SRS}^0$, $N_{SRS}^1$).

In certain aspects, a size of the second SRI field is less than or equal to a size of the first SRI field (e.g., when the first number of SRS resources are more than the second number of SRS resources). For example, when $N_{SRS}^0 > N_{SRS}^1$, the UE may not expect the SRI field value in the DCI received in the CORESET with the CORESET pool index value 1 to be larger than a value determined based on $N_{SRS}^1$.

In certain aspects, one or more SRI codepoints for the second SRI field are reserved and not used (e.g., when the size of the second SRI field is less than the size of the first SRI field). For example, the size of the first SRI field may be two bits (having SRI codepoints 0, 1, 2, 3), and the size of the second SRI field may be one bit (having SRI codepoints 0, 1). For DCI size alignment, there may still be two bits for the second SRI field, but the second SRI field may not indicate SRI codepoints 2 and 3. In other words, for the second SRI field, the SRI codepoints 2 and 3 are reserved and not used.

In certain aspects, a size of the first SRI field is less than or equal to a size of the second SRI field (e.g., when the second number of SRS resources are more than the first number of SRS resources). For example, when $N_{SRS}^0 < N_{SRS}^1$, the UE may not expect the SRI field value in the DCI received in the CORESET with the CORESET pool index value 0 to be larger than a value determined based on $N_{SRS}^0$.

In certain aspects, one or more SRI codepoints for the first SRI field are reserved and not used (e.g., when the size of first SRI field is less than the size of the second SRI field).

In certain aspects, when the UE is also configured to receive the DCIs in the second format (and another two SRS resource sets $N_{SRS,\,0\_2}^0$ and $N_{SRS,\,0\_2}^1$ are configured in the SRS resource set), above-noted techniques are applicable for the number of SRS resources of these two additional SRS resource sets, and for determination of SRI bitwidth and interpretation of SRI codepoints. Furthermore, the $N_{SRS,\,0\_2}^0$ SRS resources of the SRS resource set (e.g., for DCI format 0_2) and associated with the CORESET pool index value 0 are first $N_{SRS,\,0\_2}^0$ SRS resources of the SRS resource set (e.g., for DCI format 0_1) and associated with the CORESET pool index value 0. In addition, the $N_{SRS,\,0\_2}^1$ SRS resources of the SRS resource set (e.g., for DCI format 0_2) and associated with the CORESET pool index value 1 are first $N_{SRS,\,0\_2}^1$ SRS resources of the SRS resource set (e.g., for DCI format 0_1) and associated with the CORESET pool index value 1.

Example Wireless Communication Devices

Figure 14:
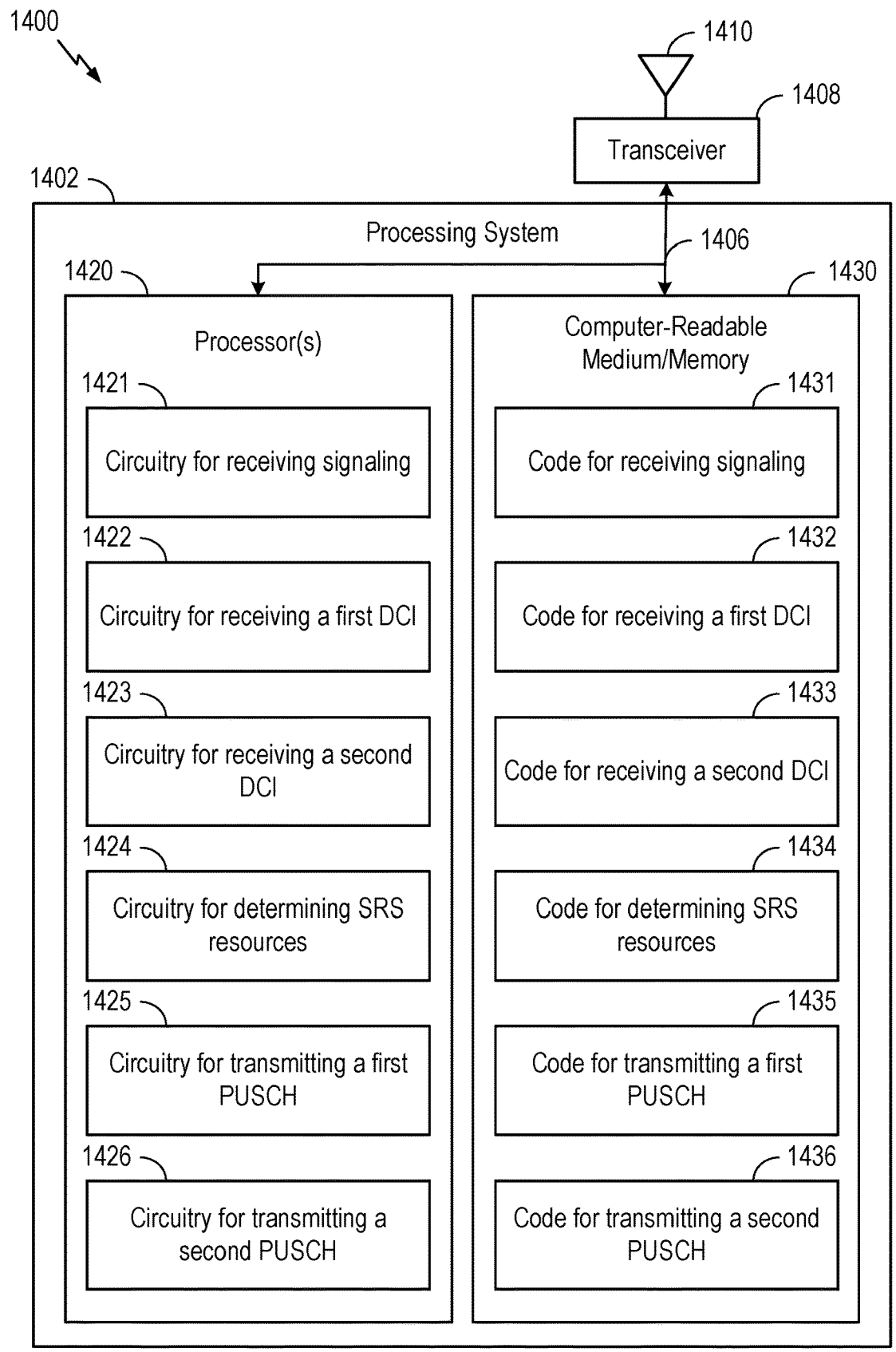
FIG. 14 depicts aspects of an example communications device.

FIG. 14 depicts an example communications device 1400 that includes various components operable, configured, or adapted to perform operations for the techniques disclosed herein, such as the operations depicted and described with respect to FIG. 11. In some examples, communication device 1400 may be a UE 104 as described, for example with respect to FIGS. 1 and 2.

Communications device 1400 includes a processing system 1402 coupled to a transceiver 1408 (e.g., a transmitter and/or a receiver). Transceiver 1408 is configured to transmit (or send) and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes one or more processors 1420 coupled to a computer-readable medium/memory 1430 via a bus 1406. In certain aspects, computer-readable medium/memory 1430 is configured to store instructions (e.g., computer-executable code) that when executed by the one or more processors 1420, cause the one or more processors 1420 to perform the operations illustrated in FIG. 11, or other operations for performing the various techniques discussed herein.

In the depicted example, computer-readable medium/memory 1430 stores code 1431 for receiving from a network entity signaling configuring the UE with at least first and second SRS resource sets, code 1432 for receiving a first DCI that schedules a first PUSCH and indicates a first SRI value, code 1433 for receiving a second DCI that schedules a second PUSCH and indicates a second SRI value, code 1434 for determining SRS resources indicated by the first and second SRI values based on an association between CORESET pool index values and the first and second SRS resource sets, code 1435 for transmitting the first PUSCH with a first set of transmission parameters-indicated by the first SRI value in accordance with the determination, and code 1436 for transmitting the second PUSCH with a second set of transmission parameters indicated by the second SRI value, in accordance with the determination.

In the depicted example, the one or more processors 1420 include circuitry configured to implement the code stored in the computer-readable medium/memory 1430, including circuitry 1421 for receiving from a network entity signaling configuring the UE with at least first and second SRS resource sets, circuitry 1422 for receiving a first DCI that schedules a first PUSCH and indicates a first SRI value, circuitry 1423 for receiving a second DCI that schedules a second PUSCH and indicates a second SRI value, circuitry 1424 for determining SRS resources indicated by the first and second SRI values based on an association between CORESET pool index values and the first and second SRS resource sets, circuitry 1425 for transmitting the first PUSCH with a first set of transmission parameters indicated by the first SRI value in accordance with the determination, and circuitry 1426 for transmitting the second PUSCH with a second set of transmission parameters indicated by the second SRI value, in accordance with the determination.

Various components of communications device 1400 may provide means for performing the methods described herein, including with respect to FIG. 11.

In some examples, means for transmitting or sending (or means for outputting for transmission) may include the transceivers 254 and/or antenna(s) 252 of the UE 104 illustrated in FIG. 2 and/or transceiver 1408 and antenna 1410 of the communication device 1400 in FIG. 14.

In some examples, means for receiving (or means for obtaining) may include the transceivers 254 and/or antenna(s) 252 of the UE 104 illustrated in FIG. 2 and/or transceiver 1408 and antenna 1410 of the communication device 1400 in FIG. 14.

In some examples, means for receiving from a network entity signaling configuring the UE with at least first and second SRS resource sets, means for receiving a first DCI that schedules a first PUSCH and indicates a first SRI value, means for receiving a second DCI that schedules a second PUSCH and indicates a second SRI value, means for determining SRS resources indicated by the first and second SRI values based on an association between CORESET pool index values and the first and second SRS resource sets, means for transmitting the first PUSCH with a first set of transmission parameters indicated by the first SRI value in accordance with the determination, and means for transmitting the second PUSCH with a second set of transmission parameters indicated by the second SRI value, in accordance with the determination, may include various processing system components, such as: the one or more processors 1420 in FIG. 14, or aspects of the UE 104 depicted in FIG. 2, including receive processor 258, transmit processor 264, TX MIMO processor 266, and/or controller/processor 280 (including SRS component 281).

Notably, FIG. 14 is an example, and many other examples and configurations of communication device 1400 are possible.

Figure 15:
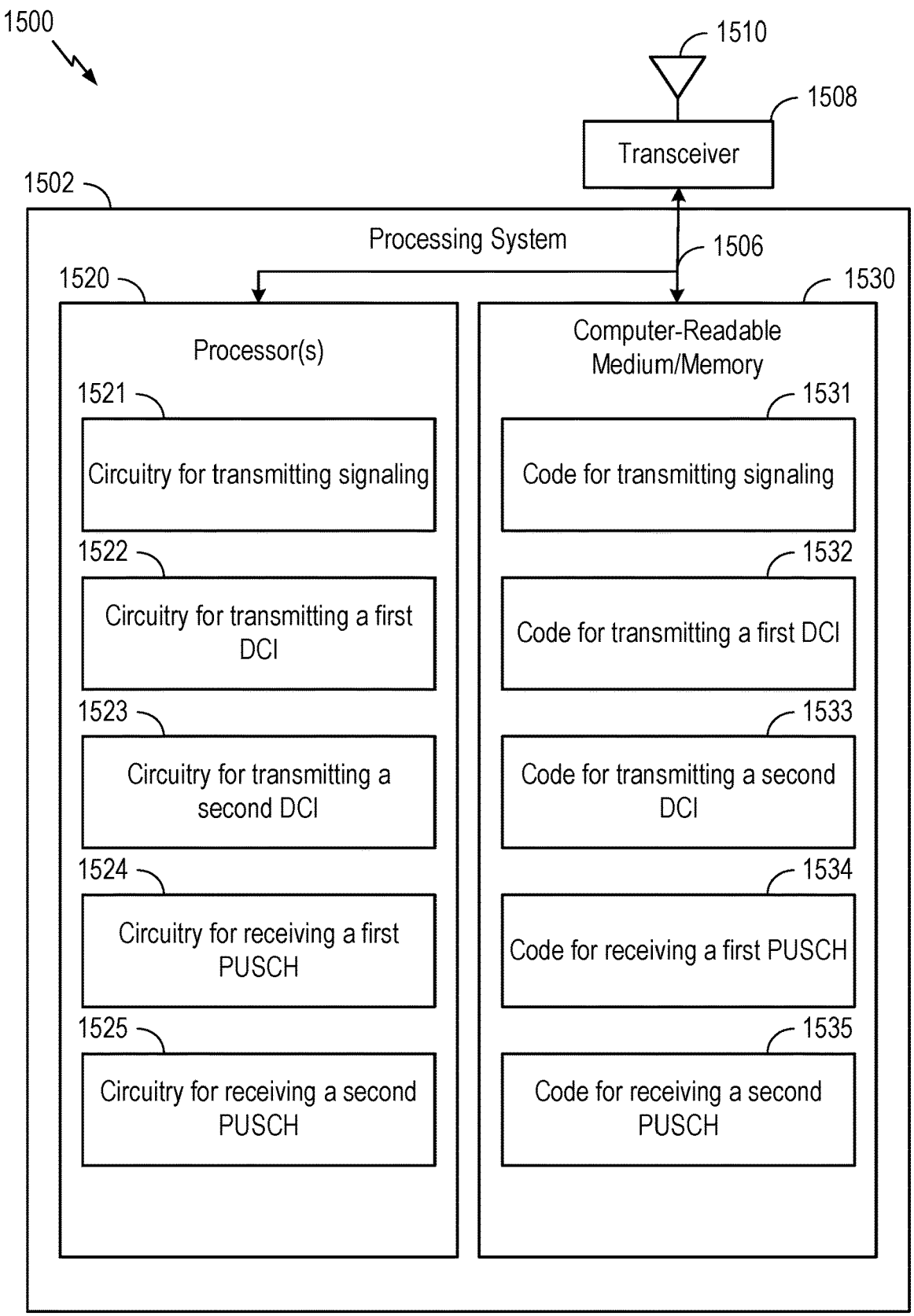
FIG. 15 depicts aspects of an example communications device.

FIG. 15 depicts an example communications device 1500 that includes various components operable, configured, or adapted to perform operations for the techniques disclosed herein, such as the operations depicted and described with respect to FIG. 12. In some examples, communication device 1500 may be a BS 102 as described, for example with respect to FIGS. 1 and 2.

Communications device 1500 includes a processing system 1502 coupled to a transceiver 1508 (e.g., a transmitter and/or a receiver). Transceiver 1508 is configured to transmit (or send) and receive signals for the communications device 1500 via an antenna 1510, such as the various signals as described herein. Processing system 1502 may be configured to perform processing functions for communications device 1500, including processing signals received and/or to be transmitted by communications device 1500.

Processing system 1502 includes one or more processors 1520 coupled to a computer-readable medium/memory 1530 via a bus 1506. In certain aspects, computer-readable medium/memory 1530 is configured to store instructions (e.g., computer-executable code) that when executed by the one or more processors 1520, cause the one or more processors 1520 to perform the operations illustrated in FIG. 12, or other operations for performing the various techniques discussed herein.

In the depicted example, computer-readable medium/memory 1530 stores code 1531 for transmitting to a UE signaling configuring the UE with at least first and second SRS resource sets, code 1532 for transmitting to the UE a first DCI that schedules a first PUSCH and indicates a first SRI value, code 1533 for transmitting to the UE a second DCI that schedules a second PUSCH and indicates a second SRI value, code 1534 for receiving the first PUSCH with a first set of transmission parameters used for transmitting SRS resources indicated by the first SRI value where the SRS resources indicated by the first and second SRI values are based on an association between CORESET pool index values and the first and second SRS resource sets, and means for, may include various processing system components, and code 1535 for receiving the second PUSCH with a second set of transmission parameters used for transmitting the SRS resources indicated by the second SRI value.

In the depicted example, the one or more processors 1520 include circuitry configured to implement the code stored in the computer-readable medium/memory 1530, including circuitry 1521 for transmitting to a UE signaling configuring the UE with at least first and second SRS resource sets, circuitry 1522 for transmitting to the UE a first DCI that schedules a first PUSCH and indicates a first SRI value, circuitry 1523 for transmitting to the UE a second DCI that schedules a second PUSCH and indicates a second SRI value, circuitry 1524 for receiving the first PUSCH with a first set of transmission parameters used for transmitting SRS resources indicated by the first SRI value where the SRS resources indicated by the first and second SRI values are based on an association between CORESET pool index values and the first and second SRS resource sets, and means for, may include various processing system components, and circuitry 1525 for receiving the second PUSCH with a second set of transmission parameters used for transmitting the SRS resources indicated by the second SRI value.

Various components of communications device 1500 may provide means for performing the methods described herein, including with respect to FIG. 12.

In some examples, means for transmitting or sending (or means for outputting for transmission) may include the transceivers 232 and/or antenna(s) 234 of the BS 102 illustrated in FIG. 2 and/or transceiver 1508 and antenna 1510 of the communication device 1500 in FIG. 15.

In some examples, means for receiving (or means for obtaining) may include the transceivers 232 and/or antenna(s) 234 of the base station illustrated in FIG. 2 and/or transceiver 1508 and antenna 1510 of the communication device 1500 in FIG. 15.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for transmitting to a UE signaling configuring the UE with at least first and second SRS resource sets, means for transmitting to the UE a first DCI that schedules a first PUSCH and indicates a first SRI value, means for transmitting to the UE a second DCI that schedules a second PUSCH and indicates a second SRI value, means for receiving the first PUSCH with a first set of transmission parameters used for transmitting SRS resources indicated by the first SRI value where the SRS resources indicated by the first and second SRI values are based on an association between CORESET pool index values and the first and second SRS resource sets, and means for receiving the second PUSCH with a second set of transmission parameters used for transmitting the SRS resources indicated by the second SRI value, may include various processing system components, such as: the one or more processors 1520 in FIG. 15, or aspects of the BS 102 depicted in FIG. 2, including receive processor 238, transmit processor 220, TX MIMO processor 230, and/or controller/processor 240 (including SRS component 241).

Notably, FIG. 15 is an example, and many other examples and configurations of communication device 1500 are possible.

Example Clauses

Implementation examples are described in the following numbered clauses:

Clause 1: A method for wireless communications by a user equipment (UE), comprising: receiving, from a network entity, signaling configuring the UE with at least first and second sounding reference signal (SRS) resource sets 104; receiving a first downlink control information (DCI) that schedules a first physical uplink shared channel (PUSCH) and indicates a first sounding reference signal (SRS) resource indicator (SRI) value; receiving a second DCI that schedules a second PUSCH and indicates a second SRI value; determining SRS resources indicated by the first and second SRI values based on an association between control resource set (CORESET) pool index values and the first and second SRS resource sets; transmitting the first PUSCH with a first set of transmission parameters indicated by the first SRI value, in accordance with the determination; and transmitting the second PUSCH with a second set of transmission parameters indicated by the second SRI value, in accordance with the determination.

Clause 2: The method alone or in combination with the first clause, wherein determining the SRS resources indicated by the first and second SRI values comprises: determining the SRS resources indicated by the first SRI value based on the association between a CORESET pool index value for a CORESET in which the first DCI was detected, and the first and second SRS resource sets; and determining the SRS resources indicated by the second SRI value based on the association between a CORESET pool index value for a CORESET in which the second DCI was detected, and the first and second SRS resource sets.

Clause 3: The method alone or in combination with one or more of the first and second clauses, wherein the first DCI and the second DCI has at least one of a first format or a second format.

Clause 4: The method alone or in combination with one or more of the first through third clauses, wherein one or more fields in the second format have fewer bits than a corresponding one or more fields in the first format.

Clause 5: The method alone or in combination with one or more of the first through fourth clauses, wherein, according to the association: whichever of the first or second SRS resource set has a lower identifier (ID) is associated with a first CORESET pool index value; and whichever of the first or second SRS resource set has a higher ID is associated with a second CORESET pool index value.

Clause 6: The method alone or in combination with one or more of the first through fifth clauses, further comprising receiving signaling indicating: a first CORESET pool index value associated with the first SRS resource set; and a second CORESET pool index value associated with the second SRS resource set.

Clause 7: The method alone or in combination with one or more of the first through sixth clauses, wherein at most one SRS resource set for a codebook (CB) or a non-CB (NCB) based transmission is configured with a CORESET pool index value.

Clause 8: The method alone or in combination with one or more of the first through seventh clauses, further comprising receiving signaling indicating: a first CORESET pool index value associated with the first SRS resource set comprising a first number of SRS resources, the first DCI is received in a CORESET with the first CORESET pool index value; and a second CORESET pool index value associated with the second SRS resource set comprising a second number of SRS resources, the second DCI is received in a CORESET with the second CORESET pool index value.

Clause 9: The method alone or in combination with one or more of the first through eighth clauses, wherein the first number of SRS resources is equal to the second number of SRS resources.

Clause 10: The method alone or in combination with one or more of the first through ninth clauses, wherein a size of a first SRI field in the first DCI is based on the first number of SRS resources and a second SRI field in the second DCI is based on the second number of SRS resources.

Clause 11: The method alone or in combination with one or more of the first through tenth clauses, wherein the first number of SRS resources is different than the second number of SRS resources.

Clause 12: The method alone or in combination with one or more of the first through eleventh clauses, wherein a size of a first SRI field in the first DCI and a second SRI field in the second DCI is based on the first number of SRS resources when the first number of SRS resources are more than the second number of SRS resources or the second number of SRS resources when the second number of SRS resources are more than the first number of SRS resources.

Clause 13: The method alone or in combination with one or more of the first through twelfth clauses, wherein a size of the second SRI field is less than or equal to a size of the first SRI field, when the first number of SRS resources are more than the second number of SRS resources.

Clause 14: The method alone or in combination with one or more of the first through thirteenth clauses, wherein one or more SRI codepoints for the second SRI field are reserved and not used, when the size of the second SRI field is less than the size of the first SRI field.

Clause 15: The method alone or in combination with one or more of the first through fourteenth clauses, wherein a size of the first SRI field is less than or equal to a size of the second SRI field, when the second number of SRS resources are more than the first number of SRS resources.

Clause 16: The method alone or in combination with one or more of the first through fifteenth clauses, wherein one or more SRI codepoints for the first SRI field are reserved and not used, when the size of first SRI field is less than the size of the second SRI field.

Clause 17: A method for wireless communications by a network entity, comprising: transmitting, to a user equipment (UE), signaling configuring the UE with at least first and second sounding reference signal (SRS) resource sets; transmitting, to the UE, a first downlink control information (DCI) that schedules a first physical uplink shared channel (PUSCH) and indicates a first sounding reference signal (SRS) resource indicator (SRI) value; transmitting, to the UE, a second DCI that schedules a second PUSCH and indicates a second SRI value; receiving the first PUSCH with a first set of transmission parameters used for transmitting SRS resources indicated by the first SRI value, the SRS resources indicated by the first and second SRI values are based on an association between control resource set (CORESET) pool index values and the first and second SRS resource sets; and receiving the second PUSCH with a second set of transmission parameters used for transmitting the SRS resources indicated by the second SRI value.

Clause 18: The method alone or in combination with the seventeenth clause, wherein the first DCI and the second DCI has at least one of a first format or a second format.

Clause 19: The method alone or in combination with the seventeenth and eighteenth clauses, wherein one or more fields in the second format have fewer bits than a corresponding one or more fields in the first format.

Clause 20: The method alone or in combination with one or more of the seventeenth through nineteenth clauses, wherein, according to the association: whichever of the first or second SRS resource set has a lower identifier (ID) is associated with a first CORESET pool index value; and whichever of the first or second SRS resource set has a higher ID is associated with a second CORESET pool index value.

Clause 21: The method alone or in combination with one or more of the seventeenth through twentieth clauses, further comprising transmitting signaling indicating: a first CORESET pool index value associated with the first SRS resource set; and a second CORESET pool index value associated with the second SRS resource set.

Clause 22: The method alone or in combination with one or more of the seventeenth through twenty-first clauses, wherein at most one SRS resource set for a codebook (CB) or a non-CB (NCB) based transmission is configured with a CORESET pool index value.

Clause 23: The method alone or in combination with one or more of the seventeenth through twenty-second clauses, further comprising transmitting signaling indicating: a first CORESET pool index value associated with the first SRS resource set comprising a first number of SRS resources, the first DCI is received in a CORESET with the first CORESET pool index value; and a second CORESET pool index value associated with the second SRS resource set comprising a second number of SRS resources, the second DCI is received in a CORESET with the second CORESET pool index value.

Clause 24: The method alone or in combination with one or more of the seventeenth through twenty-third clauses, wherein the first number of SRS resources is equal to the second number of SRS resources.

Clause 25: The method alone or in combination with one or more of the seventeenth through twenty-fourth clauses, wherein a size of a first SRI field in the first DCI is based on the first number of SRS resources and a second SRI field in the second DCI is based on the second number of SRS resources.

Clause 26: The method alone or in combination with one or more of the seventeenth through twenty-fifth clauses, wherein: the first number of SRS resources is different than the second number of SRS resources, and a size of a first SRI field in the first DCI and a second SRI field in the second DCI is based on the first number of SRS resources when the first number of SRS resources are more than the second number of SRS resources or the second number of SRS resources when the second number of SRS resources are more than the first number of SRS resources.

Clause 27: An apparatus, comprising: a memory comprising executable instructions; and one or more processors configured to execute the executable instructions and cause the apparatus to perform a method in accordance with any one of Clauses 1-26.

Clause 28: An apparatus, comprising means for performing a method in accordance with any one of Clauses 1-26.

Clause 29: A non-transitory computer-readable medium comprising executable instructions that, when executed by one or more processors of an apparatus, cause the apparatus to perform a method in accordance with any one of Clauses 1-26.

Clause 30: A computer program product embodied on a computer-readable storage medium comprising code for performing a method in accordance with any one of Clauses 1-26.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of SRS resource sets for multi-DCI based CB or NCB PUSCH in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications at a user equipment (UE), comprising:
    a memory comprising instructions; and
    one or more processors configured, individually or in any combination, to execute the instructions and cause the apparatus to:
        receive signaling configuring the UE with at least a first sounding reference signal (SRS) resource set and a second SRS resource set;
        receive a first downlink control information (DCI) that schedules a first physical uplink shared channel (PUSCH) and indicates a first sounding reference signal (SRS) resource indicator (SRI) value;
        receive a second DCI that schedules a second PUSCH and indicates a second SRI value; and
        determine SRS resources indicated by the first SRI value and the second SRI value, based on an association between control resource set (CORESET) pool index values for CORESETs in which the first DCI and the second DCI are received and identifiers (IDs) of the first SRS resource set and the second SRS resource set, wherein according to the association:
            whichever of the first or second SRS resource set has a lower ID is associated with a first CORESET pool index value; and
            whichever of the first or second SRS resource set has a higher ID is associated with a second CORESET pool index value.

2. The apparatus of claim 1, wherein the one or more processors are configured, individually or in any combination, to execute the instructions and cause the apparatus to:
    transmit the first PUSCH with a first set of transmission parameters indicated by the first SRI value, in accordance with the determination; and
    transmit the second PUSCH with a second set of transmission parameters indicated by the second SRI value, in accordance with the determination.

3. The apparatus of claim 1, wherein the one or more processors are configured, individually or in any combination, to execute the instructions and cause the apparatus to receive signaling indicating:
    the first CORESET pool index value associated with the first SRS resource set comprising a first number of SRS resources, the first DCI is received in a CORESET with the first CORESET pool index value; and
    the second CORESET pool index value associated with the second SRS resource set comprising a second number of SRS resources, the second DCI is received in a CORESET with the second CORESET pool index value.

4. The apparatus of claim 3, wherein the first number of SRS resources is equal to the second number of SRS resources.

5. The apparatus of claim 4, wherein a size of a first SRI field in the first DCI is based on the first number of SRS resources and a second SRI field in the second DCI is based on the second number of SRS resources.

6. The apparatus of claim 3, wherein the first number of SRS resources is different than the second number of SRS resources.

7. The apparatus of claim 6, wherein a size of a first SRI field in the first DCI and a second SRI field in the second DCI is based on the first number of SRS resources when the first number of SRS resources are more than the second number of SRS resources or the second number of SRS resources when the second number of SRS resources are more than the first number of SRS resources.

8. The apparatus of claim 7, wherein a size of the second SRI field is less than or equal to a size of the first SRI field, when the first number of SRS resources are more than the second number of SRS resources.

9. The apparatus of claim 8, wherein one or more SRI codepoints for the second SRI field are reserved and not used, when the size of the second SRI field is less than the size of the first SRI field.

10. The apparatus of claim 7, wherein a size of the first SRI field is less than or equal to a size of the second SRI field, when the second number of SRS resources are more than the first number of SRS resources.

11. The apparatus of claim 10, wherein one or more SRI codepoints for the first SRI field are reserved and not used, when the size of first SRI field is less than the size of the second SRI field.

12. The apparatus of claim 1, wherein the first DCI and the second DCI has at least one of a first format or a second format.

13. The apparatus of claim 1, wherein one or more fields in the second format have fewer bits than a corresponding one or more fields in the first format.

14. An apparatus for wireless communications at a network entity, comprising:
a memory comprising instructions; and
one or more processors configured, individually or in any combination, to execute the instructions and cause the apparatus to:
transmit signaling configuring a user equipment (UE) with at least a first sounding reference signal (SRS) resource set and a second SRS resource set;
transmit a first downlink control information (DCI) that schedules a first physical uplink shared channel (PUSCH) and indicates a first sounding reference signal (SRS) resource indicator (SRI) value;
transmit a second DCI that schedules a second PUSCH and indicates a second SRI value;
receive the first PUSCH with a first set of transmission parameters used for transmitting SRS resources indicated by the first SRI value, wherein the SRS resources indicated by the first SRI value and the second SRI value are based on an association between control resource set (CORESET) pool index values for CORESETs in which the first DCI and the second DCI are received and identifiers (IDs) of the first SRS resource set and the second SRS resource set; and
receive the second PUSCH with a second set of transmission parameters used for transmitting the SRS resources indicated by the second SRI value, and wherein according to the association:
whichever of the first or second SRS resource set has a lower ID is associated with a first CORESET pool index value; and
whichever of the first or second SRS resource set has a higher ID is associated with a second CORESET pool index value.

15. The apparatus of claim 14, wherein the one or more processors are configured, individually or in any combination, to execute the instructions and cause the apparatus to transmit signaling indicating:
the first CORESET pool index value associated with the first SRS resource set comprising a first number of SRS resources, the first DCI is transmitted in a CORESET with the first CORESET pool index value; and
the second CORESET pool index value associated with the second SRS resource set comprising a second number of SRS resources, the second DCI is transmitted in a CORESET with the second CORESET pool index value.

16. The apparatus of claim 15, wherein the first number of SRS resources is equal to the second number of SRS resources.

17. The apparatus of claim 16, wherein a size of a first SRI field in the first DCI is based on the first number of SRS resources and a second SRI field in the second DCI is based on the second number of SRS resources.

18. The apparatus of claim 15, wherein the first number of SRS resources is different than the second number of SRS resources.

19. The apparatus of claim 18, wherein a size of a first SRI field in the first DCI and a second SRI field in the second DCI is based on the first number of SRS resources when the first number of SRS resources are more than the second number of SRS resources or the second number of SRS resources when the second number of SRS resources are more than the first number of SRS resources.

20. The apparatus of claim 19, wherein a size of the second SRI field is less than or equal to a size of the first SRI field, when the first number of SRS resources are more than the second number of SRS resources.

21. The apparatus of claim 20, wherein one or more SRI codepoints for the second SRI field are reserved and not used, when the size of the second SRI field is less than the size of the first SRI field.

22. The apparatus of claim 19, wherein a size of the first SRI field is less than or equal to a size of the second SRI field, when the second number of SRS resources are more than the first number of SRS resources.

23. The apparatus of claim 22, wherein one or more SRI codepoints for the first SRI field are reserved and not used, when the size of first SRI field is less than the size of the second SRI field.

24. The apparatus of claim 14, wherein the first DCI and the second DCI has at least one of a first format or a second format.

25. The apparatus of claim 14, wherein one or more fields in the second format have fewer bits than a corresponding one or more fields in the first format.

26. A method for wireless communications at a user equipment (UE), comprising:
receiving signaling configuring the UE with at least a first sounding reference signal (SRS) resource set and a second SRS resource set;
receiving a first downlink control information (DCI) that schedules a first physical uplink shared channel (PUSCH) and indicates a first sounding reference signal (SRS) resource indicator (SRI) value;
receiving a second DCI that schedules a second PUSCH and indicates a second SRI value; and
determining SRS resources indicated by the first SRI value and the second SRI value, based on an association between control resource set (CORESET) pool index values for CORESETs in which the first DCI and the second DCI are received and identifiers (IDs) of the first SRS resource set and the second SRS resource set, wherein according to the association:
whichever of the first or second SRS resource set has a lower ID is associated with a first CORESET pool index value; and whichever of the first or second SRS resource set has a higher ID is associated with a second CORESET pool index value.

27. The method of claim 26, further comprising:
transmitting the first PUSCH with a first set of transmission parameters indicated by the first SRI value, in accordance with the determination; and
transmitting the second PUSCH with a second set of transmission parameters indicated by the second SRI value, in accordance with the determination.

28. A method for wireless communications at a network entity, comprising:
transmitting signaling configuring a user equipment (UE) with at least a first sounding reference signal (SRS) resource set and a second SRS resource set;
transmitting a first downlink control information (DCI) that schedules a first physical uplink shared channel (PUSCH) and indicates a first sounding reference signal (SRS) resource indicator (SRI) value;
transmitting a second DCI that schedules a second PUSCH and indicates a second SRI value;
receiving the first PUSCH with a first set of transmission parameters used for transmitting SRS resources indicated by the first SRI value, wherein the SRS resources indicated by the first SRI value and the second SRI value are based on an association between control resource set (CORESET) pool index values for CORESETs in which the first DCI and the second DCI are received and identifiers (IDs) of the first SRS resource set and the second SRS resource set; and
receiving the second PUSCH with a second set of transmission parameters used for transmitting the SRS resources indicated by the second SRI value, and wherein according to the association:
whichever of the first or second SRS resource set has a lower ID is associated with a first CORESET pool index value; and
whichever of the first or second SRS resource set has a higher ID is associated with a second CORESET pool index value.

* * * * *